W. ARTER.
ADJUSTABLE BEARING.
APPLICATION FILED SEPT. 14, 1916.
1,306,397.
Patented June 10, 1919.
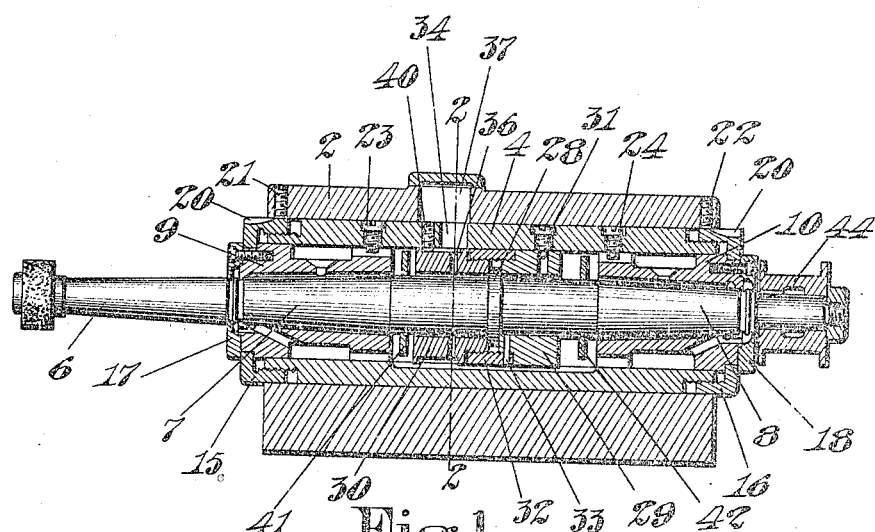
Fig.1.
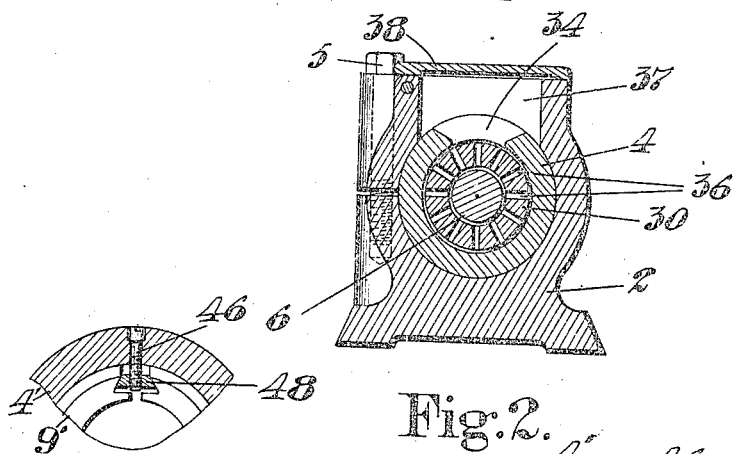
Fig.2.
Fig.4.
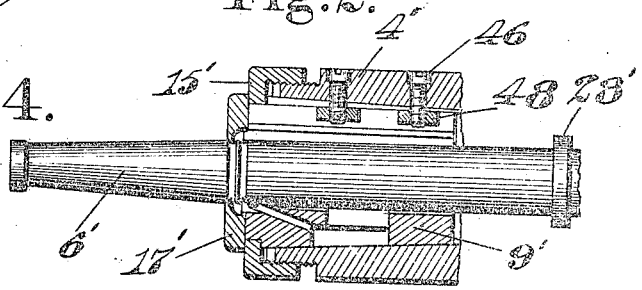
Fig.3.
INVENTOR
William Arter
by his attorneys

UNITED STATES PATENT OFFICE.

WILLIAM ARTER, OF WORCESTER, MASSACHUSETTS, ASSIGNOR TO THE PERSONS-ARTER MACHINE COMPANY, OF WORCESTER, MASSACHUSETTS, A CORPORATION OF MASSACHUSETTS.

ADJUSTABLE BEARING.

1,306,397.  Specification of Letters Patent.  Patented June 10, 1919.

Application filed September 14, 1916. Serial No. 120,101.

*To all whom it may concern:*

Be it known that I, WILLIAM ARTER, a subject of the King of Great Britain, residing at 540 Salisbury street, in Worcester and State of Massachusetts, have invented certain Improvements in Adjustable Bearings, of which the following description, in connection with the accompanying drawings, is a specification, like reference characters on the drawings indicating like parts in the several figures.

This invention relates to bearings for rotary shafts or spindles, and will be herein disclosed as embodied in a bearing mechanism designed especially for supporting the spindle that carries the grinding wheel used in internal grinding machines. Spindles of this type are driven at very high speeds and must run very accurately. Usually, they are provided with oppositely tapered journal portions that are supported in bearing bushings which, of course, are correspondingly tapered; and they often carry a thrust collar between these tapered portions which coöperates with other bearing bushings to take the end thrust of the shaft. In constructions of this character as heretofore proposed much difficulty has been experienced in adjusting the bushings to take the wear up. This difficulty is due in some constructions to the fact that the adjustment to take up end play cannot be made independently of the adjustment for wear on the lateral bearing surfaces, and in other constructions to the fact that the adjustment to take up lateral wear must be made by rotating the bearing bushings. The latter adjustment appears to disturb the alinement of the bushings in some manner, possibly due to the fact that the bearing bushings always wear eccentrically and that the rotary adjustment moves these slightly eccentric bearing surfaces somewhat out of alinement. But, whatever may be the cause of the difficulties experienced, it is a very common occurrence for the spindle and bushings to heat up to an objectionable degree immediately after any change in the adjustment of the bushings had been made.

The present invention has for its chief object to devise a bearing mechanism in which these difficulties shall be overcome. With this and other objects in view, which will hereinafter appear, the invention involves certain novel combinations and arrangements of parts, the nature of which will be readily understood from the following description of the embodiment of the invention now preferred by me.

Referring now to the accompanying drawings

Figure 1 is a central, longitudinal, sectional view of bearing mechanism constructed in accordance with this invention;

Fig. 2 is a transverse, vertical, sectional view taken on the line 2—2, Fig. 1;

Fig. 3 is a view similar to Fig. 1 showing part of a somewhat modified construction; and Fig. 4 is a transverse, cross sectional view through the upper part of the mechanism shown in Fig. 3.

The mechanism shown in the accompanying drawings comprises a bearing housing or bracket 2 which is shaped to receive a substantially cylindrical sleeve 4. The housing 2 is split on one side, as clearly shown in Fig. 2, and a bolt 5 connects the split portions and serves to clamp them on the sleeve 4 and thus hold it securely in the housing.

The spindle 6 is provided with two tapered journal portions 7 and 8 which are supported in correspondingly tapered bearing bushings 9 and 10, respectively. These two bushings fit snugly in the opposite ends of the sleeve 4 and are mounted to slide toward and from each other for purposes of adjustment. For this purpose also the ends of the sleeve 4 are reduced and threaded as shown in Fig. 1 and adjusting nuts or collars 15 and 16, respectively, are threaded on to these reduced portions. Each nut has an inwardly extending flange which bears against a shoulder formed at the outer end of its respective bearing bushing, while collars 17 and 18 bolted to the ends of the bushings 9 and 10, respectively, hold the flanges of the nuts 15 and 16 against these shoulders and thus prevent their movement axially of the bushings but permit them to turn on the bushings. Each of the nuts 15 and 16 is scored at intervals around its periphery, as indicated at 20, to permit the application thereto of a wrench of the hook spanner type. It is obvious that when either of these nuts 15 or 16 is rotated it will force its coöperating bushing into or out of the sleeve 4 and thus will effect an adjustment of the bushing relatively to the tapered journal portion of the spindle 6 which it supports. Set screws 21 and 22 are threaded through the outer wall of the housing 2 in position to bear on the nuts 15 and 16, respectively, and clamp them securely in their adjusted positions. In order to prevent any rotative movement of the bushings while they are being adjusted, two screws 23 and 24, respectively, are threaded through the upper wall of the sleeve 4 and have reduced end portions which are positioned in short grooves cut longitudinally in the bushings 9 and 10. This construction permits the bushings to slide axially of the shafts toward and from each other but prevents any turning movement of the bushings.

For the purpose of taking the end thrust on the shaft and limiting the end play of the shaft a thrust collar 28 is provided on the shaft between the journal portions 7 and 8, and two bearing bushings 29 and 30 respectively are arranged to engage opposite sides of this collar. The bushing 30 is secured fast in the sleeve 4 by means of a set screw 31 and the end of this part adjacent to the collar 28 is reduced and threaded to receive an internally threaded sleeve 32 which is fixed to the bushing by means of a pin 33. These two parts obviously might be made integral but the construction shown is preferred for manufacturing reasons. The bushing 30 also has a reduced and threaded end portion which is threaded into the sleeve 32. The two bushings 29 and 30 thus are relatively adjustable to take up wear that may occur between them and the collar 28, this adjustment being effected by turning the bushing 30 in the sleeve 32, and threading it toward or from its component bushing 29. This adjustment is facilitated by cutting a slot 34 in the sleeve 4 and drilling a series of holes 36 radially through the bushing 30 in the plane of the slot 34. A recess 37, into which the slot 34 opens, is provided in the housing 2 and is normally closed by a cover 38. By lifting this cover and inserting a wire in one of the holes 36 the bushing 30 may be turned to effect the desired adjustment. The bushing is clamped in an adjusted position by a set screw 40 which is threaded through the sleeve 4 and to which access is afforded by the opening 37.

It will now be evident that the adjustment necessary to take up end play is entirely independent from that required to compensate for wear on the lateral bearing surfaces of the parts and that any adjustment of one or both of the bushings 9 and 10 does not disturb the adjustment of the bushings 29 and 30. The above described objections heretofore experienced with mechanisms of this type are therefore entirely overcome by this construction. For any ordinary service it is of course necessary to adjust the bushing 30 only at very infrequent intervals as compared with the periods in which adjustment of the tapered bushings 9 and 10 is required.

Splash disks 41 and 42 on the shaft and the arrangement of oil ducts and passages shown facilitate the lubrication of the various friction surfaces. No detailed description of the provision made for lubricating the parts seems necessary.

Figs. 3 and 4 show a modified bearing construction adapted for use with straight shafts. In these figures the parts corresponding to those in Fig. 1 are indicated by the same reference numerals as those used in Fig. 1 but the numerals used in Figs. 3 and 4 are primed.

In this construction the ends of the sleeve 4' are reamed on a taper and the outer surfaces of the two bushings (one of which is shown at 9') that support the spindle are tapered instead of the inner surfaces being tapered as in the construction shown in Fig. 1. In order to secure the bushing 9' in an adjusted position in the sleeve 4' the bushing is split at its upper side, as clearly shown in Fig. 4, and two V shaped grooves are formed in the opposite walls of the split part so that together they constitute a dove-tail groove in which the nuts 48 for two bolts 46 are received. These bolts are loosened to permit the bushing to be adjusted longitudinally of the shaft, and are then tightened to lock the bushing in an adjusted position. The tightening or turning up of the bolts, of course, moves the nuts 46 upwardly and thus expands the bushing sufficiently to clamp it securely in the tapered bore of the sleeve 4'. Of course a companion to the bushing 9' ordinarily is employed to aid this bushing in supporting the spindle 6'; but since this companion bushing is constructed and supported in the same manner as the bushing 9', a detailed showing of this construction is unnecessary.

It will be observed that whenever it is desired to substitute one grinding wheel for another it is merely necessary to loosen the clamping bolt 5 and remove the sleeve 4 with the bushings and spindle as a unit, without disturbing the adjustment of the bushings relatively to the spindle or the sleeve. The sleeve and the parts carried thereby can later be replaced in the housing in exactly the position which it previously occupied. It will be readily appreciated by those skilled in this art that the ability to remove the sleeve and the parts carried thereby as a unit is a very important advantage in changing from one size of grinding wheel spindle to another.

Having thus described my invention, what I claim as new and desire to secure by Letters Patent of the United States is:

1. A bearing mechanism of the character described comprising a stationary sleeve, bearing bushings mounted in said sleeve for adjustment relatively thereto, a spindle rotatably supported in said bushings, and a housing in which said sleeve is mounted, said parts being constructed and arranged to enable the sleeve with said bushings and spindle to be removed as a unit from said housing without disturbing the adjustment of said bushings relatively to said spindle and sleeve.

2. A bearing mechanism of the character described comprising a sleeve, a tapered bearing bushing mounted in said sleeve, a spindle rotatable in said bushing, said bushing being mounted for slidable adjustment in said sleeve longitudinally of said spindle, means for securing said bushing in an adjusted position, a thrust collar fast on said spindle, bearing bushings engaging opposite sides of said collar and mounted for relative adjustment to take up wear between them and said collar, the latter adjustment being independent of the adjustment of said tapered bushing.

3. A bearing mechanism of the character described comprising a stationary sleeve, two tapered bushings mounted in said sleeve for slidable adjustment toward or from each other, a spindle rotatably mounted in said bushings, means for securing said bushings in their adjusted positions, a thrust collar fast on said shaft between said bushings, and bearing members engaging opposite sides of said collar and mounted for relative adjustment to take up wear between them and said collar, said bushings being adjustable independently of the adjustment of said bearing members.

4. A bearing mechanism of the character described comprising a housing, a stationary sleeve removably supported in said housing, two tapered bearing bushings mounted in said sleeve near opposite ends thereof for sliding adjustment toward or from each other, a spindle rotatably mounted in said bushings, means for adjusting said bushings toward and from each other, and means for holding said bushings against rotation while they are being adjusted by said adjusting means.

5. A bearing mechanism of the character described comprising a stationary support, two bearing bushings mounted in said support, a spindle rotatably supported in said bushings, a thrust collar fast on said spindle, and two bearing members mounted in said support for engagement with opposite sides of said collar, one of said members being mounted for threaded adjustment toward and from the other member to take up the wear between them and said collar.

6. A bearing mechanism of the character described comprising a sleeve, a tapered bearing bushing mounted in said sleeve and held against rotation therein, a spindle rotatable in said bushing, said bushing being mounted for slidable adjustment in said sleeve longitudinally of said spindle and having a groove formed therein, and a nut engaging said circumferential groove and threaded on said sleeve to effect said adjustment.

In testimony whereof I have signed my name to this specification in the presence of two subscribing witnesses.

WILLIAM ARTER.

Witnesses:
VICTOR E. RUNO,
MILDRED HILLMAN.